(No Model.) 2 Sheets—Sheet 1.
C. SCHUBERT.
SYSTEM OF LAYING OUT PATTERNS FOR GARMENTS.
No. 411,686. Patented Sept. 24, 1889.
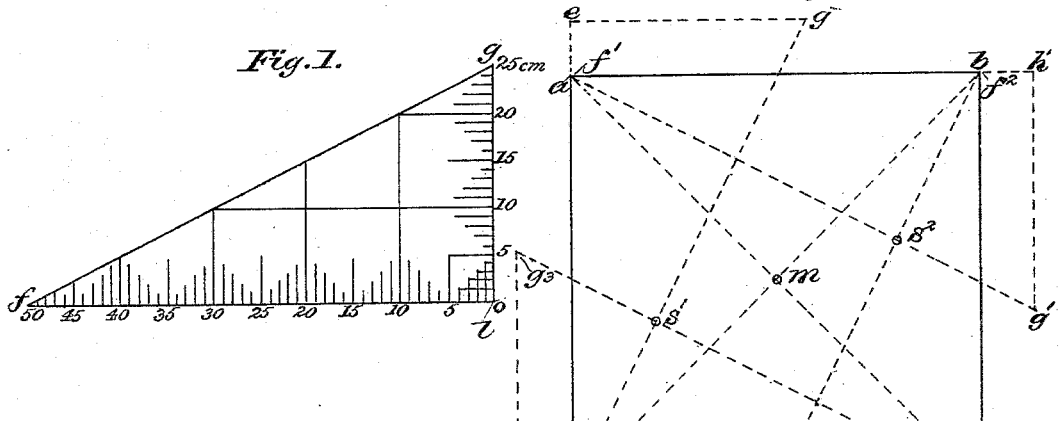
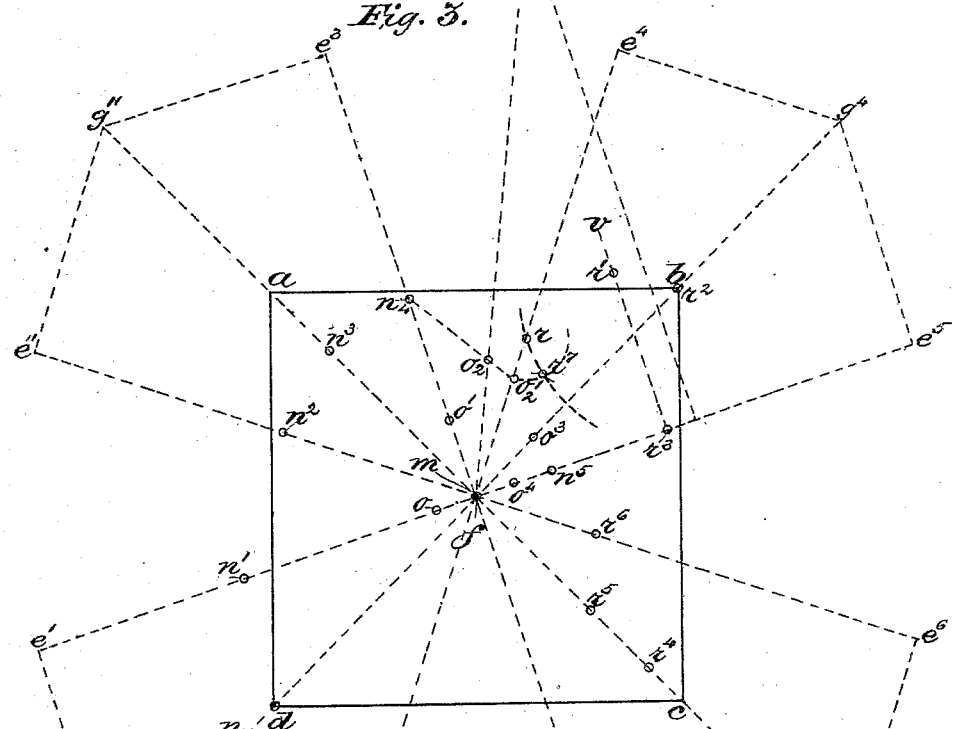
Witnesses:
Inventor
Carl Schubert
By James L. Norris
Attorney.

(No Model.) 2 Sheets—Sheet 2.

C. SCHUBERT.
SYSTEM OF LAYING OUT PATTERNS FOR GARMENTS.

No. 411,686. Patented Sept. 24, 1889.

Witnesses:
T. C. Brecht
Dennis Sumby

Inventor
Carl Schubert
By James L. Norris
Attorney.

UNITED STATES PATENT OFFICE.

CARL SCHUBERT, OF DRESDEN, SAXONY, GERMANY, ASSIGNOR TO HIMSELF AND RICHARD KREMMLER, OF SAME PLACE.

SYSTEM OF LAYING OUT PATTERNS FOR GARMENTS.

SPECIFICATION forming part of Letters Patent No. 411,636, dated September 24, 1889.

Application filed April 19, 1889. Serial No. 307,797. (No model.)

*To all whom it may concern:*

Be it known that I, CARL SCHUBERT, tailor, a citizen of Germany, residing at No. 13 Breitestrasse, Dresden, in the Kingdom of Saxony, Germany, have invented certain new and useful Improvements in the System of Measuring and Cutting Wearing-Apparel; and I do hereby declare the following to be a full, clear, and exact description of the invention, such as will enable others skilled in the art to which it appertains to make and use the same.

My invention relates to a new and improved method for the measuring and cutting of wearing-apparel, arranged according to the decimal system; and the object of this method is to produce a system of charts for the measuring and cutting of wearing-apparel, more especially ladies' dresses and body-linen, in an easier manner than has been the case heretofore, so that inexperienced dressmakers or tailors can easily learn how to take the measure of persons and cut the material for making ladies' wearing-apparel, so that they shall be well-fitting, and, finally, to accomplish this in an expeditious and easy manner.

The invention consists in a new method for the measuring and cutting of the material for wearing-apparel according to charts divided and laid out according to the decimal system, as will be more fully described hereinafter, and specifically pointed out in the claim, reference being had to the accompanying drawings, and the letters of reference marked thereon.

Figure 4:
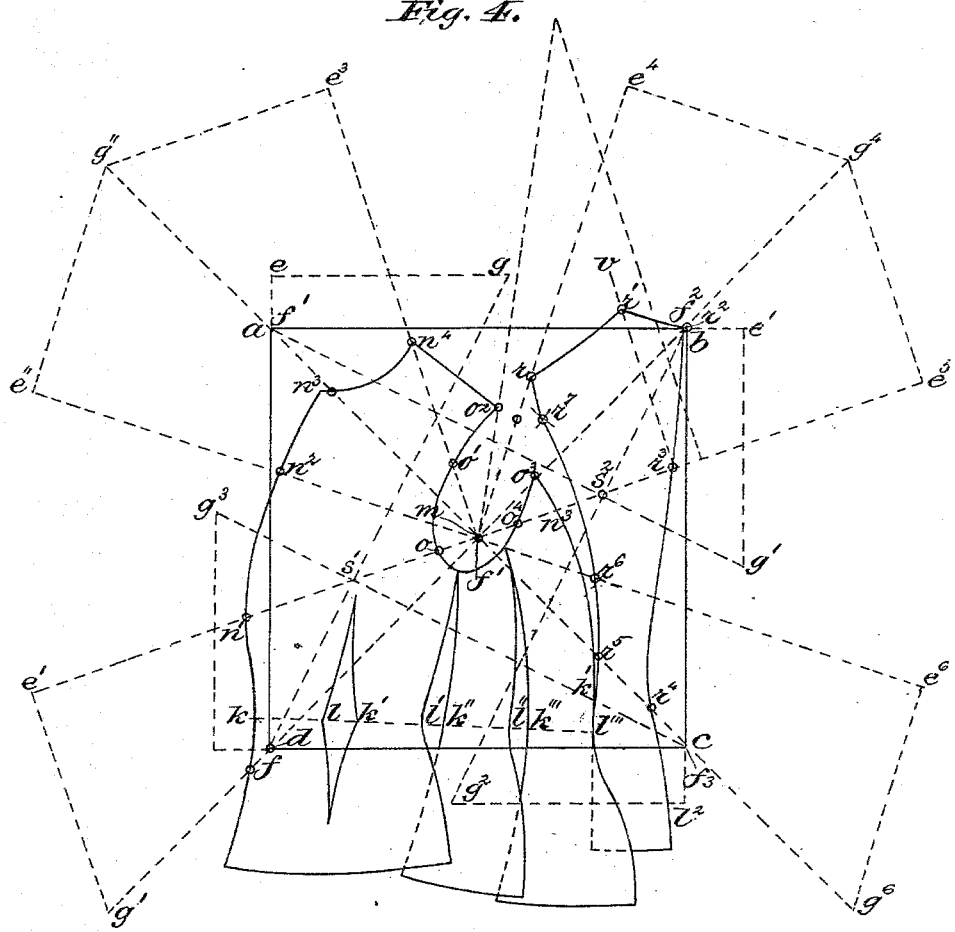
Figure 5:
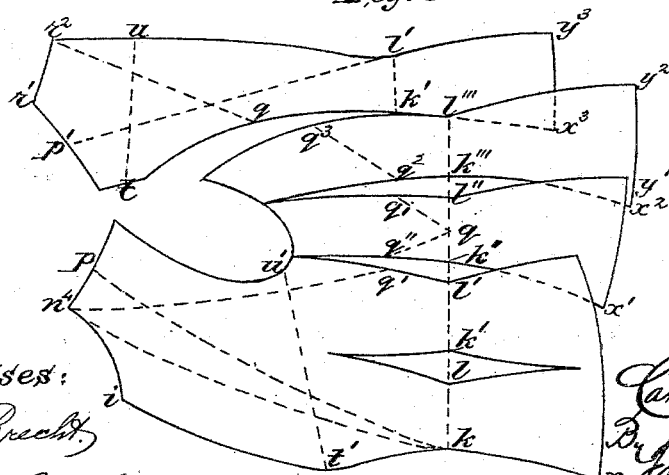

In the drawings, Figure 1 represents an auxiliary measure. Fig. 2 is a view showing the method of determining the point for cutting a lady's jacket. Fig. 3 is a view showing the method of determining the points for measuring a lady's jacket. Fig. 4 is a view of a cut of a lady's jacket, produced of cutting and measuring points. Fig. 5 is a view of a cut of a lady's jacket with the points of the controlling-measures drawn.

The auxiliary measure necessary in employing this method consists of a rectangular triangle, in which the small side measures twenty-five and the other side fifty centimeters, both of said sides being provided with centimetrical divisions, as will be seen in Fig. 1 of the drawings.

The method consists, mainly, in the development of the drawing for the cut-out of a square, whose size will be determined by a measure taken from the body—such as the upper width of the breast for the wearing-apparel for covering the upper part of the body and the width of the hips for the covering of the lower limbs.

For the better illustration of this method and to better explain the same, the manner of determining the points out of which the outlines of the cut is determined, Figs. 2, 3, and 4 of the drawings are represented for a certain piece of wearing-apparel and for a certain measure or cut, and, as an example, a lady's jacket is taken for a measured upper width of eighty-eight centimeters, in the following manner:

A square $a\ b\ c\ d$ is first drawn, whose sides $ab$, $bc$, $cd$, and $da$ are each half of the upper width taken, being therefore forty-four centimeters long. Draw from $a$ to $c$ and $b$ to $d$ the diagonal lines, which cross each other at the center $m$ and bisect the square. Then the auxiliary measure $e\ f\ g$ is laid with its pointed angle placed to the corners $a$, $b$, $c$, and $d$ of the square, (see Fig. 2,) so that the hypotenuse of the auxiliary measure is toward the inner side or center of the square, and draw with the hypotenuse of the auxiliary measure the lines $f$, $g$, $f'$, $g'$, $f^2$, $g^2$, and $f^3$, $g^3$, which bisect each other at the points $s'$ and $s^2$. The central point $m$ forms the center of the arm-pit, the cutting-point $s'$ the nipple, the point $s^2$ the highest point of the shoulder-bone, and the corner $d$ of the square the position of the navel in the flat drawing of the formation of the body, as seen in Figs. 2 and 4 of the drawings. These points having now been obtained, the triangles $e'$, $f'$, $g'$, $e^2$, $f'$, $g^2$, $e^3$, $f'$ $g^2$, $e^4$, $f'$, $g^4$, $e^5$, $f'$, $g^4$ and $e^6$, $f'$, $g^6$ are drawn in the square $a\ b\ c\ d$, the auxiliary measure being placed in the center with the pointed angle $f$ extending with the hypotenuse over the corners $a$, $b$, $c$, and $d$ of the square. (See Figs. 3 and 4.) On the lines $f'\ g'$ thus obtained the tenth part of a side of the square is marked eight times to obtain the point $n$; and so on $f'$ $e'$ once to obtain the point $o$, and six times to obtain $n'$; on $f'$ $e''$ five times to obtain $n^2$; on $f'$ $g''$ five times to obtain $n^3$; on $f'$ $e^3$ twice to obtain $o'$, and five times to obtain $n^4$; on $f'$ $e^4$ three times to obtain $o^{2\prime}$, and four times to obtain $r$; on $f'$ $g^4$ twice to obtain $o^3$, and seven times to obtain $r^2$; on $f'$ $e^5$ once to obtain $o^4$, twice to obtain $n^5$, and five times to obtain $r^3$; on $f'$ $e^6$ three times to obtain $r^6$, and on $f'$ $g^6$ four to obtain $r^5$, and six times to obtain $r^4$. Then $n^4$ is connected with $o^{2\prime}$, and the auxiliary measure is placed with point $g$ on $m$ and also on $f'$ $e^5$, so that the line $n^4$ $o^2$ is cut by the hypotenuse, in doing which the point $o^2$ is obtained. Then the auxiliary measure is moved on $f'$ $e^5$ to the point $r^3$, and the line $r^3$ $v$ is drawn, measuring upon this line four-tenths of a side of the square to obtain $r$, and then by taking $r^2$ as a center and striking the arc of a circle with a radius of four-tenths of the side of the square and in like manner striking an arc from $r$ with a radius of one-tenth of the side of the square the point of intersection of these arcs will be the point $r^7$, as shown in Figs. 3 and 4. The points thus obtained, viz., $n$, $n'$, $n^2$, $n^3$, $n^4$, $o^2$, $o'$, $o$, $o^4$, $o^3$, and $n^5$, connected together give principally the shape of the front part, and the points $r$, $r'$, $r^2$, $r^3$, $r^4$, $r^5$, and $r^6$ give the shape of the rear part. In order to finish the shape, it is only necessary to ascertain the height of the waist and the center of the waist.

The correctness of the cut thus obtained can easily be ascertained by measuring on the body the width of the breast, back, hips, half of the height of the shoulder and the entire height of the shoulder, the bust in front and back, and then to examine the measures obtained in the cut—viz., the width of the breast from $l'$ to $u'$, the width of the back from $t$ to $u$, the hips from $x$ to $y'$, $x'$ to $y'$, $x^2$ to $y^2$, and $x^3$ to $y^3$, half the height of the shoulder from $r^2$ to $r'$ and $n^4$ to $k$, the front of the bust from $n^4$ to $q'$ and $q^2$ to $q$, and the back part $q$ to $q'$, from $q^2$ to $q^3$, and from $q^4$ to $r^2$, as will be readily seen in Fig. 5. The shape of the sleeve results in the same manner from the half-width of the breast.

This method has the essential advantage over other systems that the designer ascertains at once the positions of the points relatively to one another in the drawing, so that the drawing of the cut is always correct, whereas in the systems hitherto used the tailor can seldom obtain suitable designs, because the difficulty is to ascertain correctly the exact position of single points to one another; for although the design may appear correct according to the measures taken it will appear distorted, which fault can only be remedied by trying on and fitting to the body—an operation much objected to by many persons.

What I claim as my invention is—

The method set forth of cutting wearing-apparel, the same consisting in developing the design from a diagram of a square the sides of which correspond in length with one-half the measurement of the body, such as the waist measurement, laying off upon the square on its interior surface a series of right-angled triangles, each having a base of twenty-five centimeters and a perpendicular of fifty centimeters, the smaller angles being placed at the angles of the square and the perpendiculars coinciding in part with its sides, establishing the central point of the square and the points of intersection of the hypotenuses of the triangles, then laying off a series of equal and similar right-angled triangles having their smaller angles meeting at the center of the square and the hypotenuse of each passing through the angles of the square and the perpendiculars intersecting both the adjacent sides of the square, laying off upon the lines thus formed the decimal parts of one side of the square, as set forth, laying off a right-angled triangle with one of its acute angles at the center of the square, and the base thereof coinciding with one of the perpendiculars intersecting the side of the square, laying off the decimal measurement set forth upon the hypotenuse of said triangle, erecting a line upon the perpendicular which intersects the side of the square, striking from one angle of the square as a center an arc with a radius of four-tenths of the side of the square, and from the point $r$ an arc having a radius of one-tenth of said side, thus establishing the point $r^7$ and connecting the cutting-points in the manner set forth, substantially as described.

In testimony whereof I affix my signature in presence of two witnesses.

CARL SCHUBERT.

Witnesses:
CARL FR. REICHELT,
PAUL DRUCKMÜLLER.